US007980475B2

(12) United States Patent
Halbur et al.

(10) Patent No.: US 7,980,475 B2
(45) Date of Patent: Jul. 19, 2011

(54) CAKE TOPPER TRANSACTION PRODUCT

(75) Inventors: Ted C. Halbur, Lino Lakes, MN (US);
Shawn P. Boyd, St. Paul, MN (US);
John Dudley, Western Springs, IL (US);
Kelly Ryan, Lemont, IL (US); Denise Wilson, Aurora, IL (US); Rosalin Siv, Chicago, IL (US); Raphael Lin, Hong Kong (CN); Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 628 days.

(21) Appl. No.: 12/138,684

(22) Filed: Jun. 13, 2008

(65) Prior Publication Data

US 2009/0308931 A1  Dec. 17, 2009

(51) Int. Cl.
*G06K 19/00* (2006.01)
(52) U.S. Cl. ......................................... 235/487; 235/380
(58) Field of Classification Search .................... None
See application file for complete search history.

(56) References Cited

U.S. PATENT DOCUMENTS

| | | | |
|---|---|---|---|
| 1,629,531 A | 5/1927 | Reisert | |
| 2,503,587 A | 4/1950 | Murphy | |
| 4,330,060 A * | 5/1982 | Thornton | 206/459.5 |
| 4,568,269 A | 2/1986 | Lin | |
| 4,801,478 A | 1/1989 | Greenblatt | |
| D349,261 S * | 8/1994 | Huang | D11/184 |
| 5,622,490 A * | 4/1997 | Cheng | 431/288 |
| 5,673,802 A | 10/1997 | Valentino | |
| 6,736,632 B2 | 5/2004 | Wolter | |
| 6,808,388 B2 | 10/2004 | Lee | |
| 6,923,641 B1 | 8/2005 | Tabor | |
| 7,290,713 B2 | 11/2007 | Dean et al. | |
| 7,314,179 B1 | 1/2008 | Halbur et al. | |
| 7,316,357 B2 | 1/2008 | Lindahl et al. | |
| 7,360,710 B2 | 4/2008 | Lindahl et al. | |
| 2002/0143697 A1 | 10/2002 | Gotfried | |
| 2005/0246928 A1 | 11/2005 | Lee | |
| 2006/0080539 A1 | 4/2006 | Asami et al. | |
| 2006/0153344 A1 | 7/2006 | Lee | |
| 2006/0161439 A1 | 7/2006 | Selg et al. | |
| 2007/0045404 A1 * | 3/2007 | Andersen et al. | 235/380 |

(Continued)

OTHER PUBLICATIONS

"Mechanically Convertible Transaction Product", U.S. Appl. No. 11/753,854, filed May 25, 2007.

(Continued)

*Primary Examiner* — Seung H Lee
*Assistant Examiner* — Sonji Johnson
(74) *Attorney, Agent, or Firm* — Griffiths & Seaton PLLC

(57) ABSTRACT

A transaction product for use as a cake topper includes a body portion, an auxiliary portion and a machine readable account identifier. The body portion defines a support member and a flange extending from the support member. The flange is configured for placement into a frosting layer on a cake. The body portion defines a first part of a character. The auxiliary portion is formed separately from the body portion and defines a second part of the character. The auxiliary portion defines a lip configured for placement into the frosting layer on the cake. The account identifier is coupled to at least one of the body portion and the auxiliary portion and links the transaction product to an account or record for tracking a value associated with the transaction product. Other cards, products, assemblies and methods of encouraging use of such cards, products and assemblies are also disclosed.

25 Claims, 13 Drawing Sheets

U.S. PATENT DOCUMENTS

2007/0241198 A1 10/2007 Halbur et al.
2007/0281113 A1 12/2007 Hensley
2009/0139120 A1* 6/2009 Albert .................................. 40/1

OTHER PUBLICATIONS

"Transaction Product With Removable Articles", U.S. Appl. No. 11/843,844, filed Aug. 23, 2007.
"Transaction Product With Generator", U.S. Appl. No. 11/931,961, filed Oct. 31, 2007.
"Transaction Card With Movable Member", U.S. Appl. No. 11/965,474, filed Dec. 27, 2007.
"Justice just for girls!" http://www.shopjustice.com/store, printed on Jun. 12, 2008, 2 pages.
http://www.shopjustice.com/items/jus/images/xlarge/1721015_.jpg, printed on Jun. 12, 2008, 1 page.
Wade, Will, "First Data Sees Sticker Device as Mobile-Pay Bridge," American Banker, Aug. 25, 2008, 2 pages.
"Contactless Payments: Consumer Trends and Usage Preferences," firstdata.com, 2008, 2 pages.
"Payment Processing: Mobile Commerce and the M-Wallet: A Market Brief," Retail Solutions Online, May 10, 2007, 2 pages.

* cited by examiner

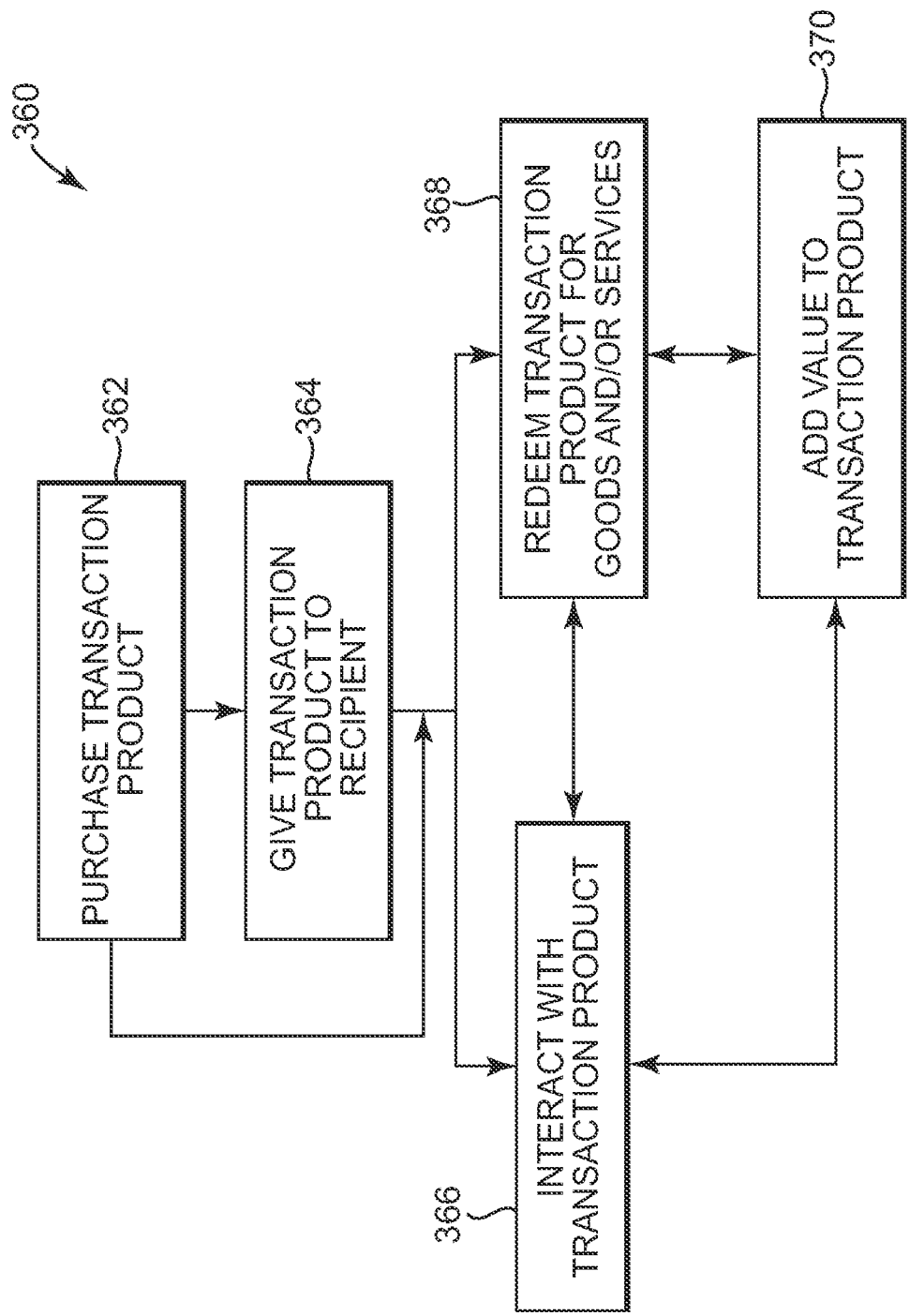

US 7,980,475 B2

CAKE TOPPER TRANSACTION PRODUCT

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product for use as a cake topper including a body portion, an auxiliary portion and a machine readable account identifier. The body portion defines a support member and a flange extending from the support member. The flange is configured for placement into a frosting layer on a cake. The body portion defines a first part of a character. The auxiliary portion is formed separately from the body portion and defines a second part of the character. The auxiliary portion defines a lip configured for placement into the frosting layer on the cake. The account identifier is coupled to at least one of the body portion and the auxiliary portion and links the transaction product to an account or record for tracking a value associated with the transaction product. Other embodiments and methods are also disclosed.

BRIEF DESCRIPTION OF THE DRAWINGS

Embodiments of the invention will be described with respect to the figures, in which like reference numerals denote like elements, and in which:

FIG. 17 is a flow chart illustrating a method of using a transaction product, according to one embodiment of the present invention.

DETAILED DESCRIPTION

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality and amusement in addition to the ability to pay for goods and/or services with the transaction product. In particular, the transaction product presents the original consumer and/or other bearer of the transaction product with a cake topper or decoration, a posable character, a multiple piece character, a candle holder and/or a musical or other audio device in addition to providing the consumer with the functionality of a transaction product.

Figure 14:
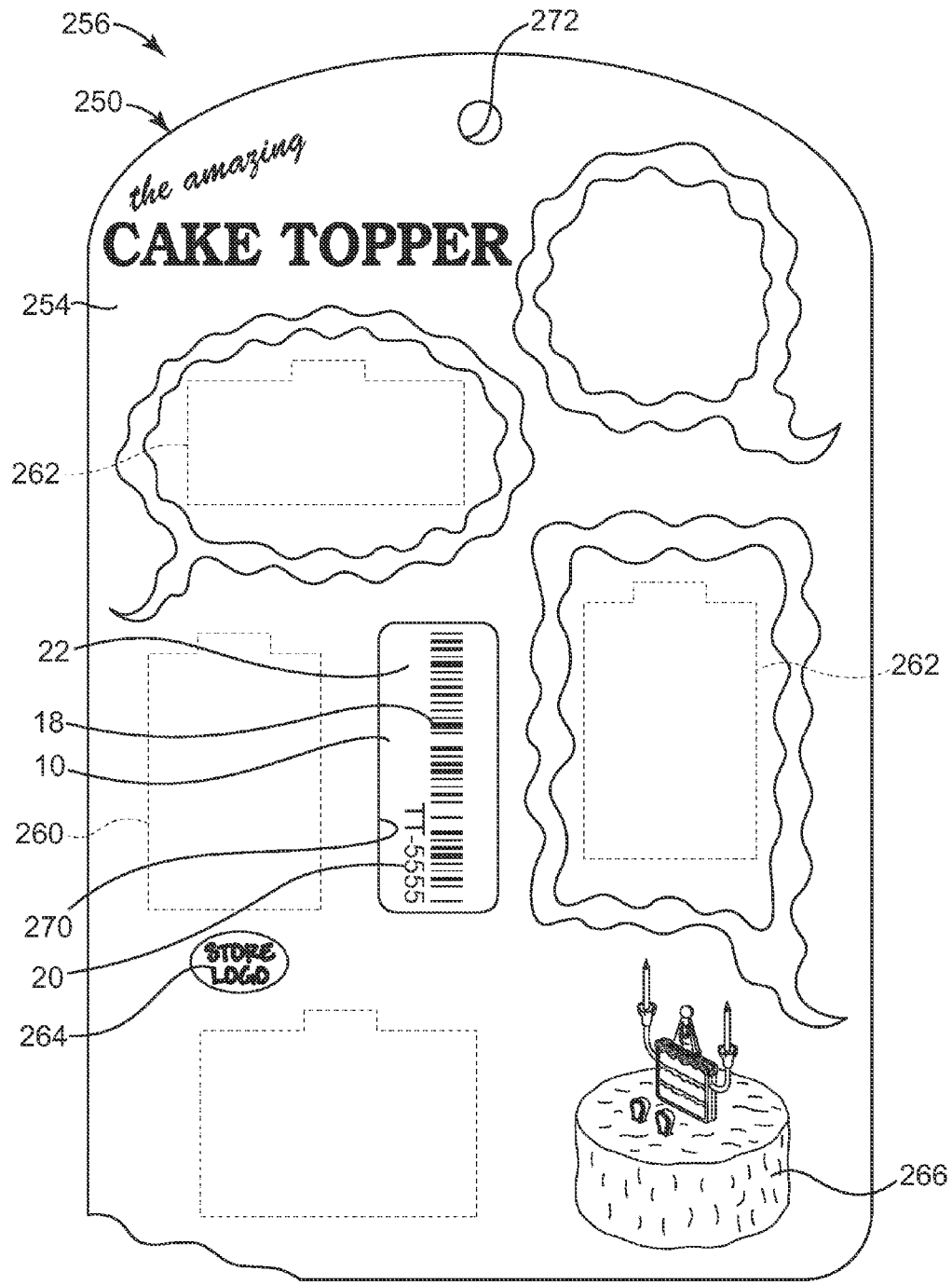
FIG. 14 is a rear view illustration of a transaction product assembly including the backer of FIG. 13 with the transaction product of FIG. 1, according to one embodiment of the present invention.

Turning to the figures, FIGS. 1-12 illustrate one embodiment of a transaction product 10 such as a stored-value product (e.g., gift card, phone card, etc.), credit product, etc. according to the present invention. Transaction product 10 is configured to be used toward the purchase and/or use of goods and/or services and is additionally configured to be used as a decoration for a cake 12 or other similar item (e.g., other dessert items) and/or as an amusing interactive character. For example, transaction product 10 is configured to be placed on top of cake 12 into a frosting layer 14 on cake 12 to decorate cake 12 for a special occasion such as a birthday, anniversary, etc. In one embodiment, transaction product 10 is configured to facilitate display of other, for instance, more conventional, cake decoration items on cake 12 such as birthday or other candles 16 as will be described in further detail below. In one example, transaction product 10 may hold candles 16 without being used on cake 12 and/or otherwise provide one or more of a posable character and audio outputting device. In one embodiment, candles 16 are offered as part of transaction product 10 and/or transaction product assembly 256 (FIG. 14).

Transaction product 10 includes an account identifier 18 (e.g., FIG. 4) such as a bar code, magnetic strip, a smart chip or other electronic device, a radio frequency identification (RFID) device or other suitable identifier readily machine readable by a point-of-sale terminal or other account access station or kiosk. Account identifier 18 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic device(s) on transaction product 10 itself. Accordingly, by scanning account identifier 18, the account or record linked to transaction product 10 is identified and can subsequently be activated, have amounts debited therefrom and/or have amounts added thereto.

In one embodiment, account identifier 18 includes a character string or code 20 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 18 is one example of means for linking transaction product 10 with an account or record, and scanning of account identifier 18 is one example of means for activating or loading value on transaction product 10.

Figure 1:
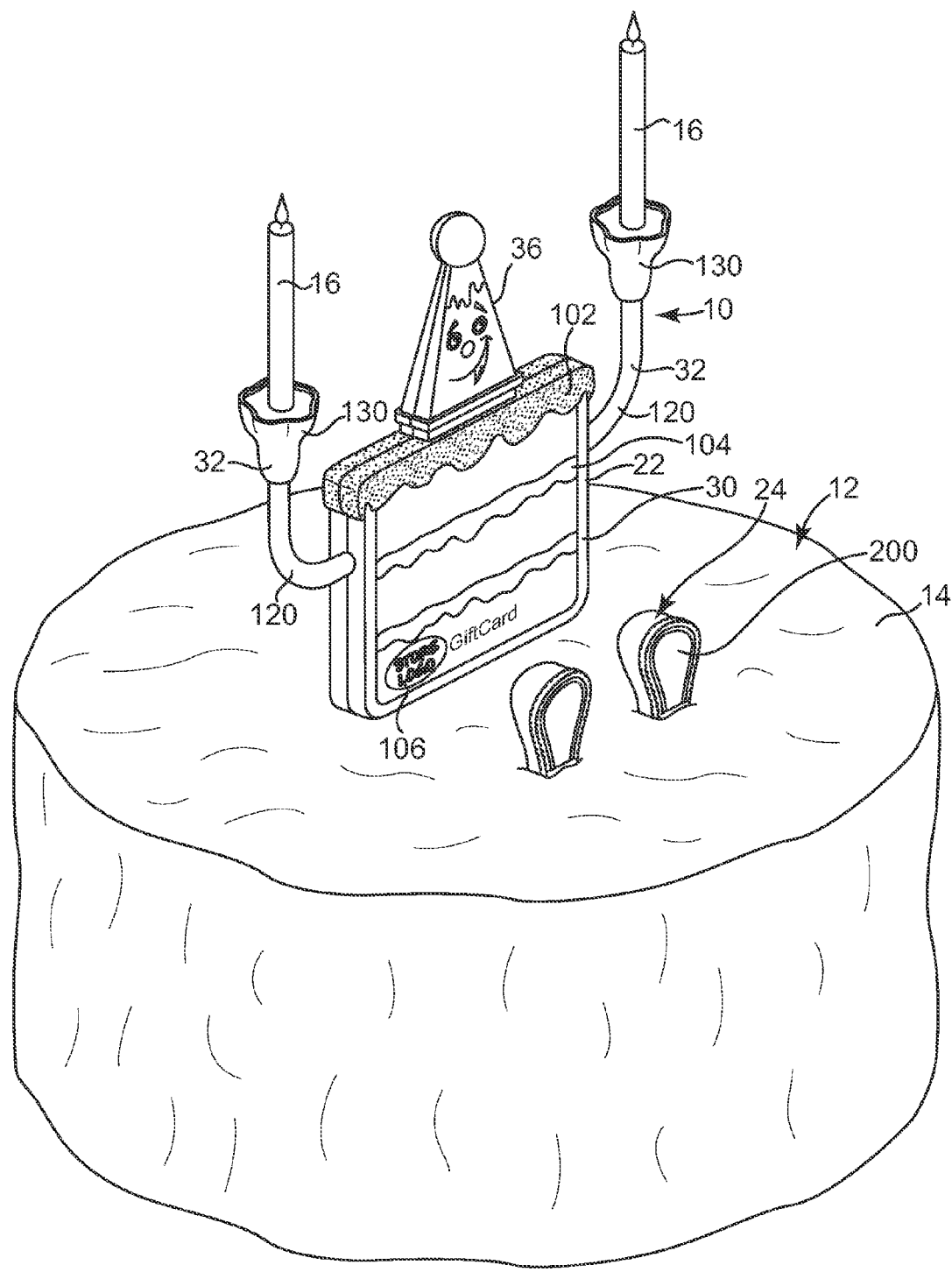
FIG. 1 is a perspective view illustration of a transaction product during use as a cake topper, according to one embodiment of the present invention.

In one embodiment, transaction product 10 is an aggregate of two or more pieces such as a first piece and a second piece. In one example, the first piece is a primary or body portion 22 of transaction product 10, and second piece is an auxiliary portion 24 such as a feet portion as illustrated in FIG. 1. In one embodiment, one or more of portions 22 and 24 are configured to be placed on cake 12 for decoration. As such, transaction product 10 provides an amusing and aesthetically pleasing decoration for cake 12 or other similar item in addition to providing transaction functionality as will be further described below.

In one embodiment, body portion 22 of transaction product 10 includes an enclosure or housing 30, one or more appendage member 32 and/or an electrical circuit 34 (FIGS. 8 and 12) with one or more activation device 36. In one embodiment, electrical circuit 34 is enclosed within housing 30 and each activation device 36 is configured to interact with electrical circuit 34. In particular, in one example, where transaction product 10 depicts a character or similar representation of a living creature, housing 30 depicts a body of the character, one of activation devices 36 depicts a head or other suitable portion of the character, and the one or more appendage members 32 depict arms of the character. Upon user interaction with activation device(s) 36 (e.g., pressing, switching, sliding or other suitable movement of activation device(s) 36), electrical circuit 34 is activated to automatically play a musical melody or to otherwise omit a suitable sound (e.g., a single audible tone or a series of audible tones).

Figure 8:
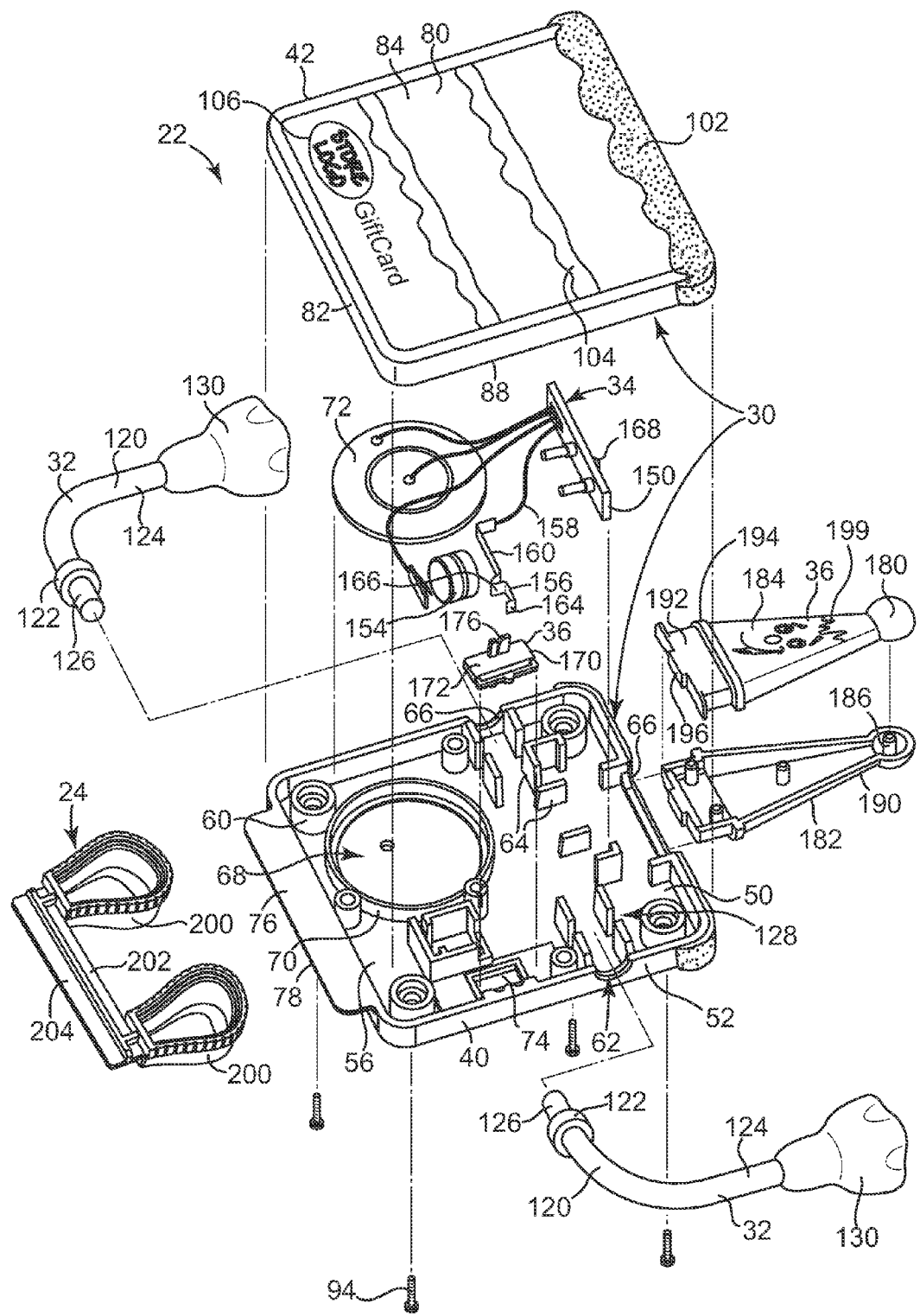
FIG. 8 is an exploded, perspective view illustration of the transaction product of FIG. 1, according to one embodiment of the present invention.

Referring to the exploded perspective view of FIG. 8, in one embodiment, housing 30 includes a first support or housing member 40 and a second support or housing member 42. In one embodiment, first housing member 40 is a base, and second housing member 42 is a cover. In one embodiment, base 40, as described with reference to FIGS. 4 and 8, generally includes a primary panel 50 and a side wall 52. Primary panel 50 is generally planar and defines an outside surface 54 (FIG. 4) and an inside surface 56 (e.g., FIG. 8) opposite outside surface 54. In one embodiment, primary panel 50 is generally rectangular and sized similar to an identification card, a credit card or other card sized to fit in a wallet of a user. In other embodiments, primary panel 50 is otherwise shaped as a square, circle, oval, star or any other suitable shape.

Side wall 52 extends from inside surface 56 away from outside surface 54 and, in one example, substantially about an entire perimeter of primary panel 50. In one embodiment, side wall 52 extends with a generally perpendicular orientation relative to primary panel 50. Side wall 52 extends from primary panel 50 to define an inside edge 58 opposite primary panel 50.

In one embodiment, cylindrical protrusions 60 extend from inside surface 56 of primary panel 50 in a direction substantially parallel to side wall 52. In one example, each cylindrical protrusion 60 is at least partially hollow so as to receive a corresponding feature of cover 42, as will be further described below, to facilitate alignment and coupling of base 40 with cover 42. Other features configured to facilitate alignment and coupling of base 40 and cover 42 are also contemplated.

In one embodiment, positioning features 62 are defined by base 40 and are configured to facilitate proper placement of other components of transaction product 10 relative to housing 30. For example, positioning features 62 may include one or more of protruding features 64 and cutout features 66. Protruding features 64 generally extend from inside surface 56 of primary panel 50 in any suitable direction such as substantially parallel to side wall 52. Each protruding feature 64 is configured to interact with one or more components of electrical circuit 34 or other components of transaction product 10 to facilitate the proper positioning of components relative to one another with respect to housing 30.

In one example, cutout features 66 of housing 30 are at least partially defined by base 40 to facilitate positioning and/or coupling of other components of transaction product 10 to housing 30. For example, cutout features 66 may at least partially allow other components such as activation device(s) 36 and appendage member(s) 32 to extend from an interior of housing to an exterior of housing 30, for instance through side wall 52 or primary panel 50.

A speaker reception area 68 may be defined by inside surface 56 of base 40 and/or any other suitable portion of housing 30. In particular, in one embodiment, a rim 70 sized similarly to or slightly larger than a speaker 72 (e.g., FIGS. 8 and 12) of electrical circuit 34, which will be further described below, extends from inside surface 56 in a direction generally parallel to side wall 52. Rim 70 is configured to receive and/or at least partially surround speaker 72 upon assembly in a manner substantially fixing speaker 72 in place relative to base 40 and housing 30 as a whole.

In one example, base 40 or other portion of housing 30 defines an aperture 74 (FIG. 8) through one or more of primary panel 50 and side wall 52. Aperture 74 is sized and shaped to provide access to one of activation devices 36 such as a switch partially maintained within housing 30 as will be further described below.

In one embodiment, a flange 76 extends from a bottom portion of base 40 in a plane substantially parallel to primary panel 50. More specifically, in one embodiment, flange 76 extends from inside edge 58 of side wall 52 in a direction away from primary panel 50 to define a lower edge 78 opposite primary panel 50. Flange 76 is configured to facilitate placement of transaction product 10 into frosting layer 14 or another suitable portion of cake 12 (FIG. 1) such that body portion 22 will extends substantially upright from cake 12. In one example, flange 76 is substantially planar and relatively thin to facilitate embedding of flange 76 into frosting layer 14 without generally disturbing the placement of frosting layer 14 on cake 12 except for positions in immediate contact with flange 76. In one embodiment, assembled housing 30 defines a first thickness, and flange 76 extends from housing 30 with a second thickness that is less than about half of the first thickness. In one embodiment, flange 76 is alternatively formed entirely or in part by cover 42 as will be apparent to those of skill in the art upon reading the present application. In view of the above, flange 76 is one example of means for embedding the body portion 22 into layer of frosting 14 on cake 12.

Figure 2:
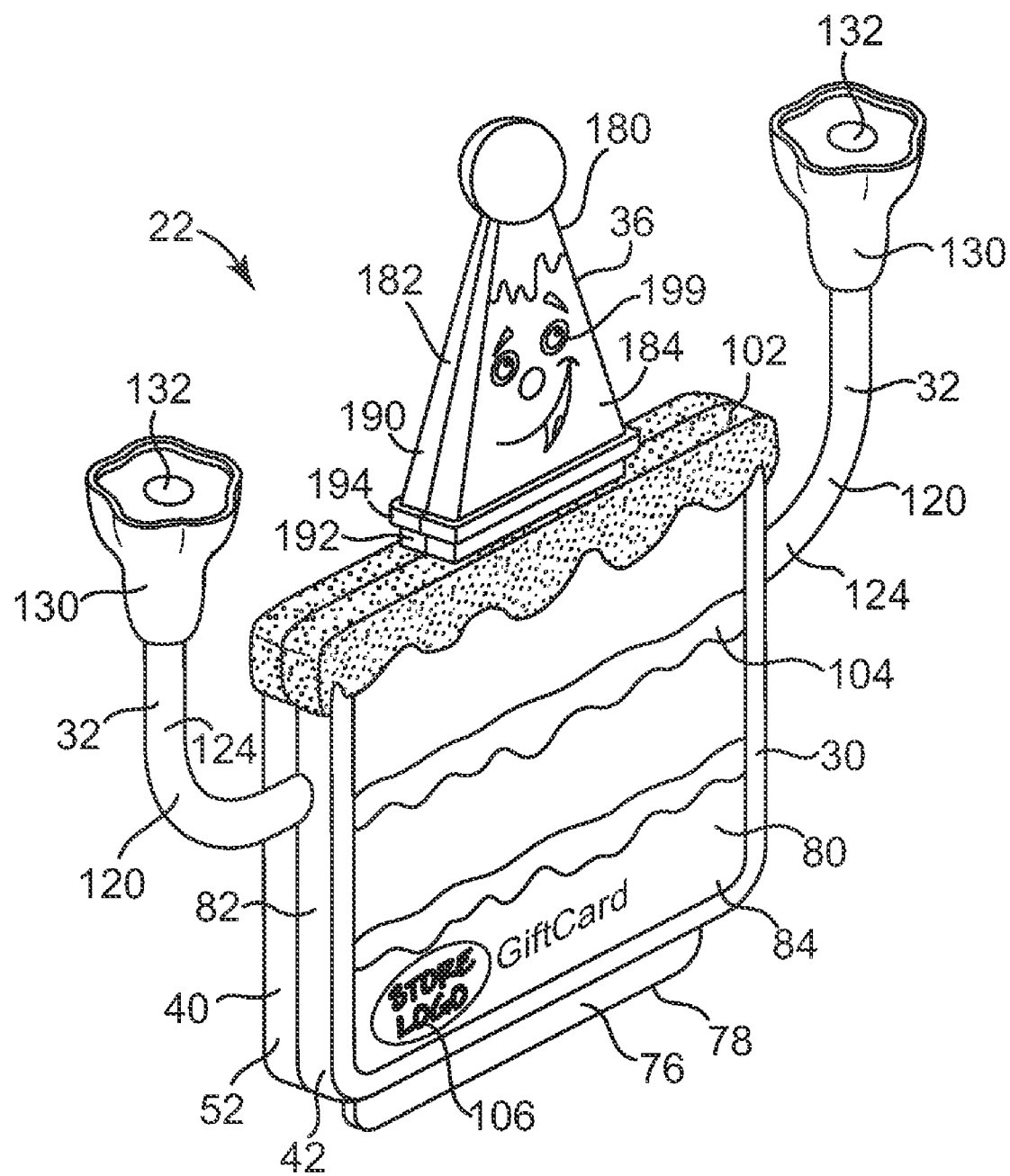
FIG. 2 is a perspective view illustration of a portion of the transaction product of FIG. 1, according to one embodiment of the present invention.
Figure 3:
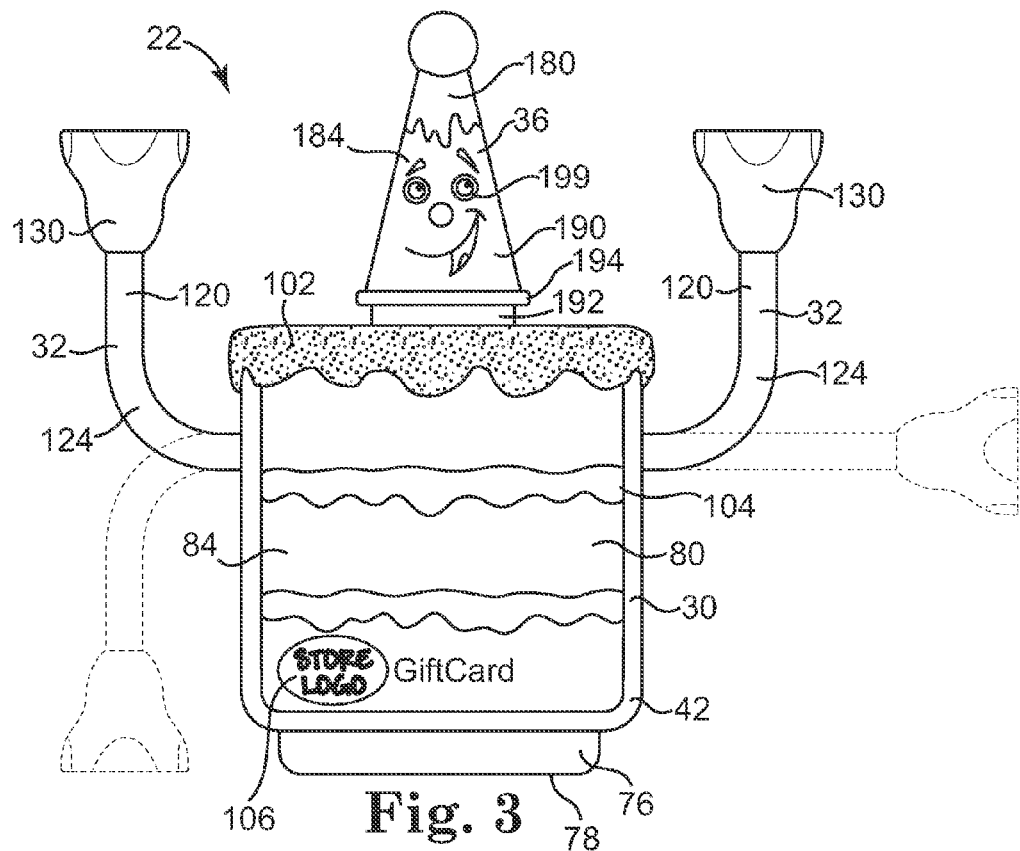
FIG. 3 is a front view illustration of the portion of the transaction product of FIG. 2, according to one embodiment of the present invention.
Figure 9:
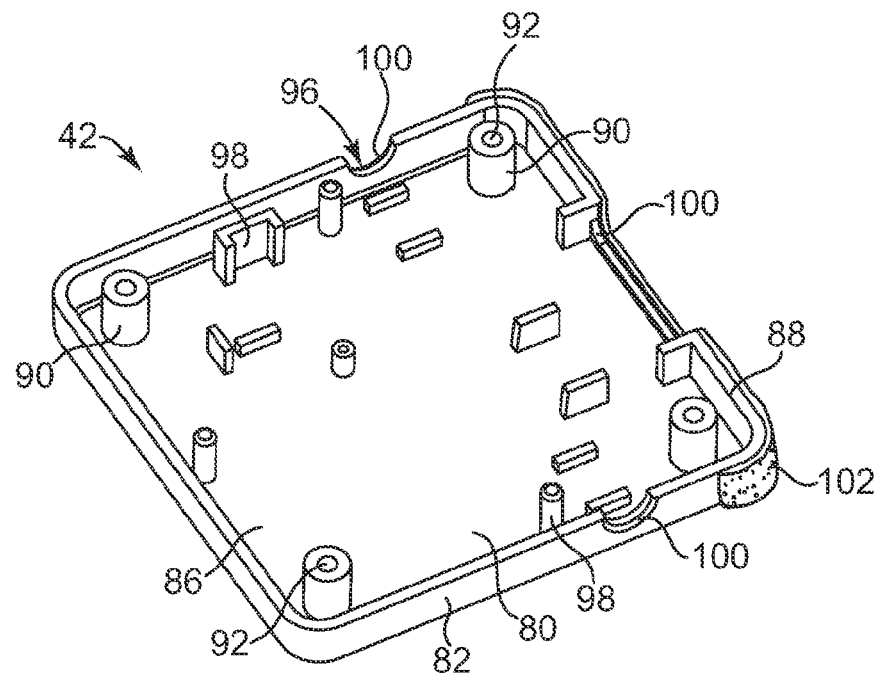
FIG. 9 is an inside perspective view illustration of the transaction product of FIG. 1, according to one embodiment of the present invention.
Figure 10:
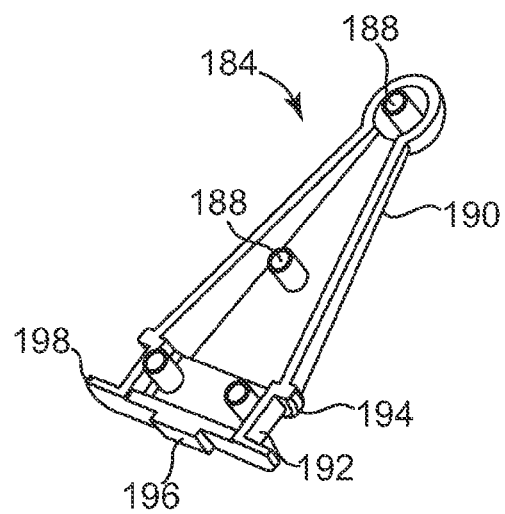
FIG. 10 is a perspective view illustration of a portion of an activation device of the transaction product of FIG. 1, according to one embodiment of the present invention.

One embodiment of cover 42 is illustrated with primary reference to FIGS. 2, 8 and 9. Cover 42 generally includes a primary panel 80 and a side wall 82. Primary panel 80 is generally planar and defines an outside surface 84 (e.g., FIGS. 2 and 8) and an inside surface 86 (FIG. 9) opposite outside surface 84. In one embodiment, primary panel 80 is generally sized similar to primary panel 50 of base 40. Side wall 82 extends from inside surface 86 about a substantial entirety of a perimeter of primary panel 80. For example, side wall 82 extends with a generally perpendicular orientation relative to primary panel 80. In one embodiment, side wall 82 extends from primary panel 80 to collectively form an inside edge 88 opposite primary panel 80. Inside edge 88 is sized and shaped to at least partially abut inside edge 58 of base 40 upon assembly of housing 30 as will be further described below.

Referring to FIG. 9, in one example, cover 42 includes a plurality of protrusions 90 (e.g., substantially cylindrical protrusions) extending from inside surface 86 parallel to side wall 82. Each of the plurality of protrusions 90 is positioned on cover 42 to generally align with one of cylindrical protrusions 60 of base 40 (FIG. 8) upon assembly of housing 30 to facilitate alignment and coupling of base 40 with cover 42. In one embodiment, each protrusion 90 is hollow to define a cavity 92 for receiving a connecting device 94 such as a screw, rivet, etc. In one embodiment, cavity 92 is threaded to facilitate securing a corresponding connecting device 94 at least partially therein.

In one embodiment, positioning features 96 are defined by cover 42 and are configured to facilitate proper placement of other components of transaction product 10 relative to housing 30. For example, positioning features 96 may include one or more of protruding features 98 and cutout features 100. Protruding features 98 generally extend from inside surface 86 of primary panel 80 in any suitable direction such as substantially parallel to side wall 82. Each protruding feature 98 is configured to interact with one or more components of electrical circuit 34 or other components of transaction product 10 to facilitate the proper positioning of components relative to one another with respect to housing 30.

In one example, cutout features 100 of cover 42 facilitate positioning and/or coupling of other components of transaction product 10 to housing 30 such that components may at least partially extend out of housing 30. For example, cutout features 100 may at least partially allow other components such as activation device(s) 36 and appendage member(s) 32 to extend from an interior of housing to an exterior of housing 30, for instance, through side wall 82 or primary panel 80. In one embodiment, at least a portion of cutout features 100 mirror placement of cutout features 66 of base 40 such that, upon assembly of housing 30, cutout features 66 and 100 collectively define apertures providing access to an internal cavity defied by housing 30 between base 40 and cover 42.

In one embodiment, each of base 40 and cover 42 is formed by injection molding plastic (e.g., polycarbonate, polystyrene, polyvinyl chloride (PVC), acrylonitrile butadiene styrene (ABS), polyethylene terephthalate (PET), teslin, polypropylene (PP), polylactide (PLA) and acrylic) or other suitable material to define the various attributes of base 40 and cover 42. In one example, base 40 and cover 42 are each substantially rigid. Other methods of forming base 40 and cover 42 are also contemplated.

In one embodiment, while primary panels 50 and 80 and side walls 52 and 82 are each substantially planar and smooth, a textured or other projecting member 102 is formed to project from one or more of primary panels 50 and 80 and side walls 52 and 82. In one example, projecting member 102 adds to the pleasing aesthetic and three-dimensional nature of transaction product 10. For example, where the character defined by transaction product 10 is a man depicted as being formed partially of cake, projecting member 102 may serve to depict a frosting layer protruding from the depicted piece of cake defined by housing 30 as depicted in at least FIGS. 1-7.

In one embodiment, housing 30 and/or other portions of transaction product 10 include decorative indicia 104, which contribute to an overall pleasing aesthetic of transaction product 10. In one example, decorative indicia 104 relate to a particular occasion, such as a wedding, new baby, graduation, holiday, season, brand identifier, media format identifier or other visual design to promote purchase of transaction product 10. In one embodiment, decorative indicia 104 help define the character depicted by transaction product 10, for example, defining facial features of the character and other characteristics (e.g., the cake-like body of the character as depicted in FIGS. 1-4). Housing 30 or other portions of transaction product 10 may also include brand indicia 106, which identify a brand associated with transaction product 10 such as identifying a product brand, a store brand, department, etc.

Figure 4:
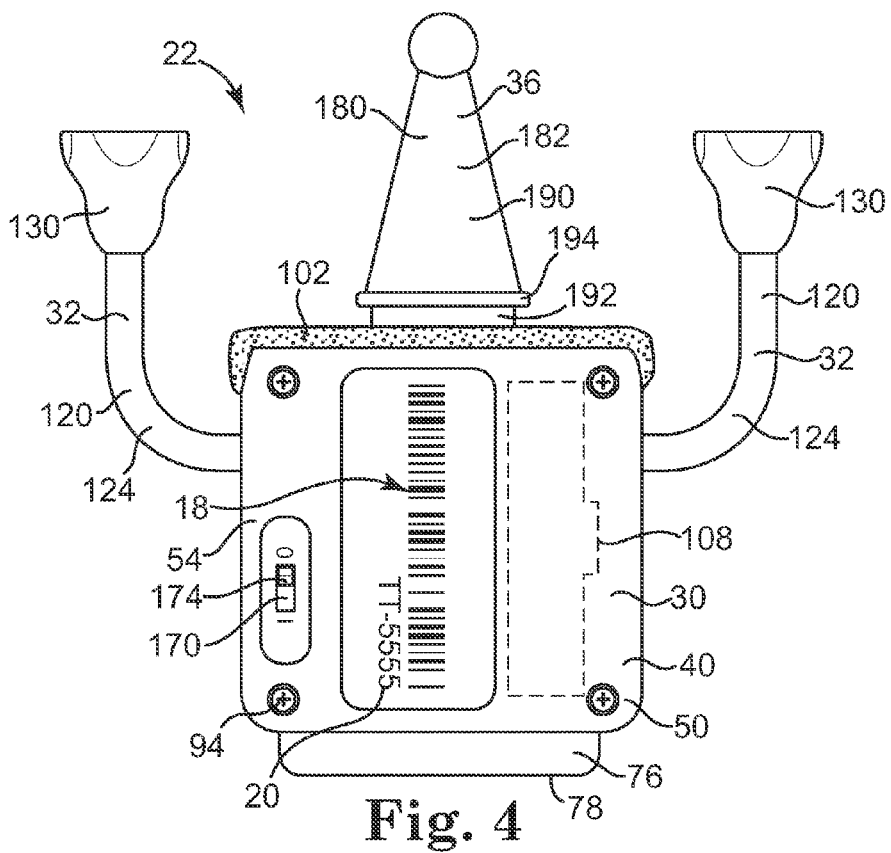
FIG. 4 is a rear view illustration of the portion of the transaction product of FIG. 2, according to one embodiment of the present invention.
Figure 5:
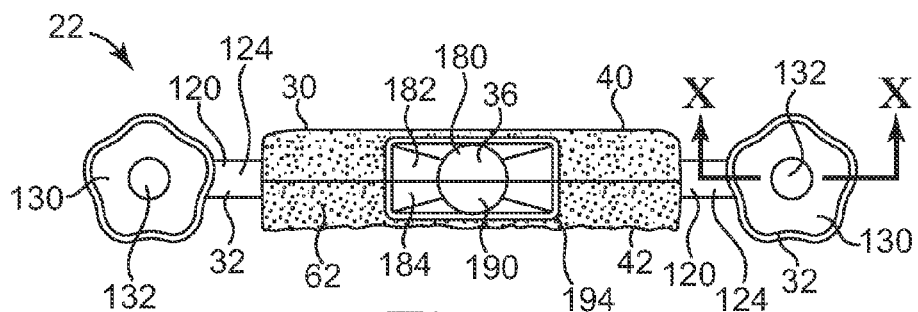
FIG. 5 is a top view illustration of the portion of the transaction product of FIG. 1, according to one embodiment of the present invention.
Figure 6:
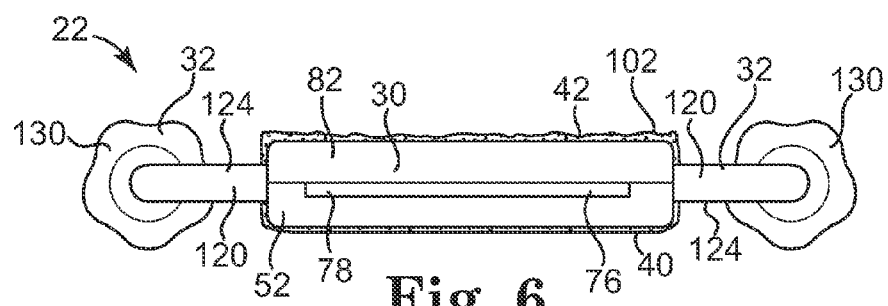
FIG. 6 is a bottom view illustration of the portion of the transaction product of FIG. 2, according to one embodiment of the present invention.
Figure 7:
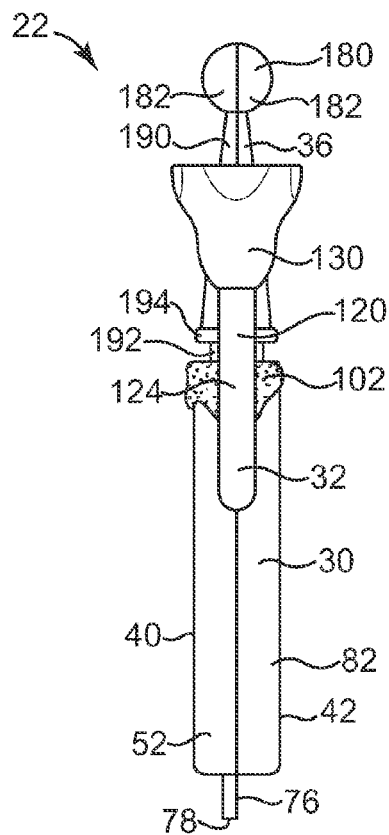
FIG. 7 is a left side view illustration of the portion of the transaction product of FIG. 2, according to one embodiment of the present invention, wherein the right side view is a mirror image thereof.

In one embodiment, transaction product 10 includes redemption indicia 108 as generally indicated with a dashed line box in FIG. 4 on, for example, one or both of outside surface 54 of base 40 and outside surface 84 of cover 42. Redemption indicia 108 indicate that transaction product 10 is redeemable for the purchase of goods and/or services and that, upon use, a value of the purchased goods and/or services will be deducted from the financial account or record linked to transaction product 10. In one embodiment, redemption indicia 108 include phrases such as "<NAME OF STORE> Gift-Card" and "This GiftCard is redeemable for merchandise or services at any of our stores or at our web site," and/or provides help or phone line information in case of a lost, stolen or damaged stored-value card, etc. In one embodiment, in which housing 30 is formed by injection molding, account identifier 18, redemption indicia 108 and one or more of any other indicia or information on transaction product 10 are printed onto outside surface 54 or outside surface 84 of housing 30.

In one embodiment, one or more appendage members 32 are coupled with housing 30. In one example, each appendage member 32 extends from an interior of housing 30 to an exterior of housing 30. In one embodiment, each appendage member 32 extends from the interior of housing 30 out an aperture defined by one or more of cutout features 66 and 100. Appendage members 32 may be formed in any suitable manner configured to hold candles such as birthday candles and to support the candles above cake 12. In one example, in addition or as an alternative to serving as candle holders, appendage members 32 each define an appendage (e.g., an arm, leg, tail or other substantially elongated protruding member) of the character defined by transaction product 10.

In one embodiment, each appendage member 32 defines an arm or other elongated section 120 and a ring or rim 122. Rim 122 extends around and projects outwardly from the circumference of a discrete portion of elongated section 120 near one end thereof. In this manner, rim 112 defines a first or external portion 124 of elongated section 120 on one side of rim 122 and a second or internal portion 126 of elongated section 120 on the other side of rim 122. Rim 122 is configured to facilitate attachment of appendage member 32 to housing 30. More specifically, in one embodiment, one or more of protruding features 64 and 98 define a reception slot 128 for receiving rim 122 between base 40 and cover 42. In one example, where elongated section 120 and rim 122 each have a circular transverse cross section, reception slot 128 is configured to allow rotation of appendage member 32 about a longitudinal axis thereof relative to housing 30.

In one embodiment, each appendage member 32 additionally defines a candle receptor 130, for example, on an end opposite rim 122. Each candle receptor 130 is configured to receive and securely maintain a candle 16. For instance, each candle receptor 130 defines a cavity 132 (e.g., FIGS. 2 and 11) extending from an end of the respective appendage member 32 toward the opposite end thereof. Each cavity 132 is sized and shaped to receive a predetermined size of candle 16 such as readily available birthday candles (e.g., defines a diameter similar to, but slightly larger than a diameter of the expected candle 16 such as less than about 8 mm, for instance, about 6.5 mm). In view of the above, each candle receptor 130 is one example of means for securely maintaining a candle 16, and body portion 22 is one example of means for supporting candle receptor(s) 130.

In one embodiment, each appendage member 32 is substantially rigid and stationary. In other embodiments, each appendage member 32 is movable relative to housing 30. For example, at least one appendage member 32 is rotatable about its longitudinal axis near internal portion 126 and rim 122. In one embodiment, each appendage member 32 additionally or alternatively is configured to be manipulated into any one of a plurality of configurations (e.g., as indicated in dashed lines in FIG. 3) and to maintain a desired configuration. For example, each appendage member 32 is configured to be posed by the product bearer into a plurality of desired configurations.

Figure 11:
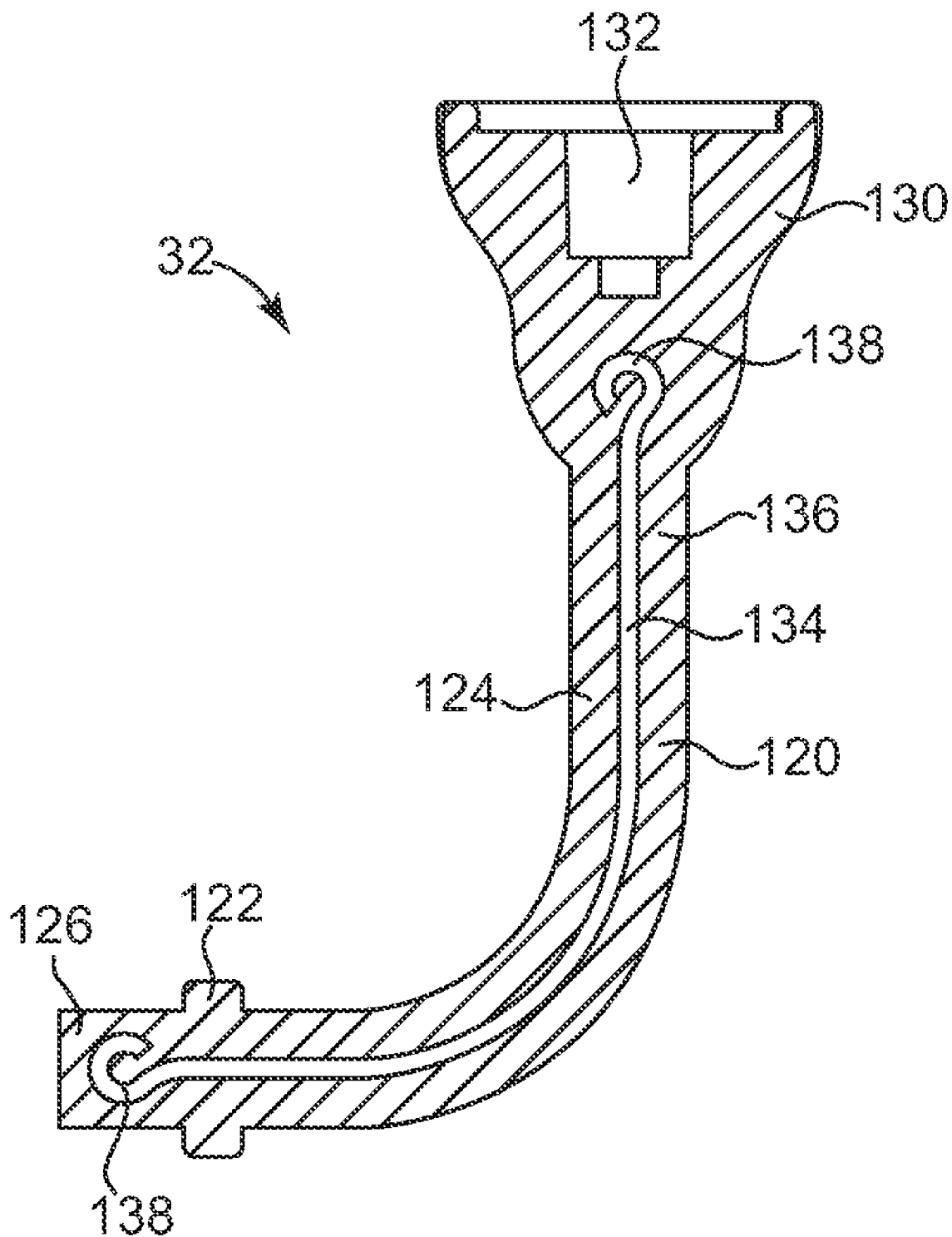
FIG. 11 is a cross-sectional view illustration of an elongated member of the transaction product taken along the line X-X in FIG. 5, according to one embodiment of the present invention.

Referring to the cross-sectional view of FIG. 11, in one embodiment, each appendage member 32 includes cladding 136 formed around a bendable wire 134. In one embodiment, cladding 136 is injection-molded, bendable polyvinyl chloride (PVC) or other suitable readily deformable plastic. Wire 134 is any suitable metal wire configured to easily and repeatedly bend when manipulated by a bearer of transaction product 10 between different configurations and to maintain a desired configuration when the bearer stops manipulating appendage member 32. In one embodiment, a bend or hook 138 is formed at each end of wire 134 to prevent or at least decrease the chance that any sharp ends of wire 134 will inadvertently break through cladding 136. While illustrated herein as being substantially identical, it should be understood that a plurality of appendage members 32 are contemplated wherein one or more of the appendage members 32 differs in structure, materials and/or appearance from at least one other appendage member 32.

Electrical circuit 34 is substantially enclosed within housing 30 and is configured to selectively provide audio or other electrical output upon initiation by the bearer of transaction product 10. Audio output may be any suitable tone, melody, etc. In one embodiment, audio output is specifically directed toward a special occasion. For example, where transaction product 10 is marketed toward a birthday, transaction product 10 is configured to selectively output the "Happy Birthday to You" melody.

Figure 12:
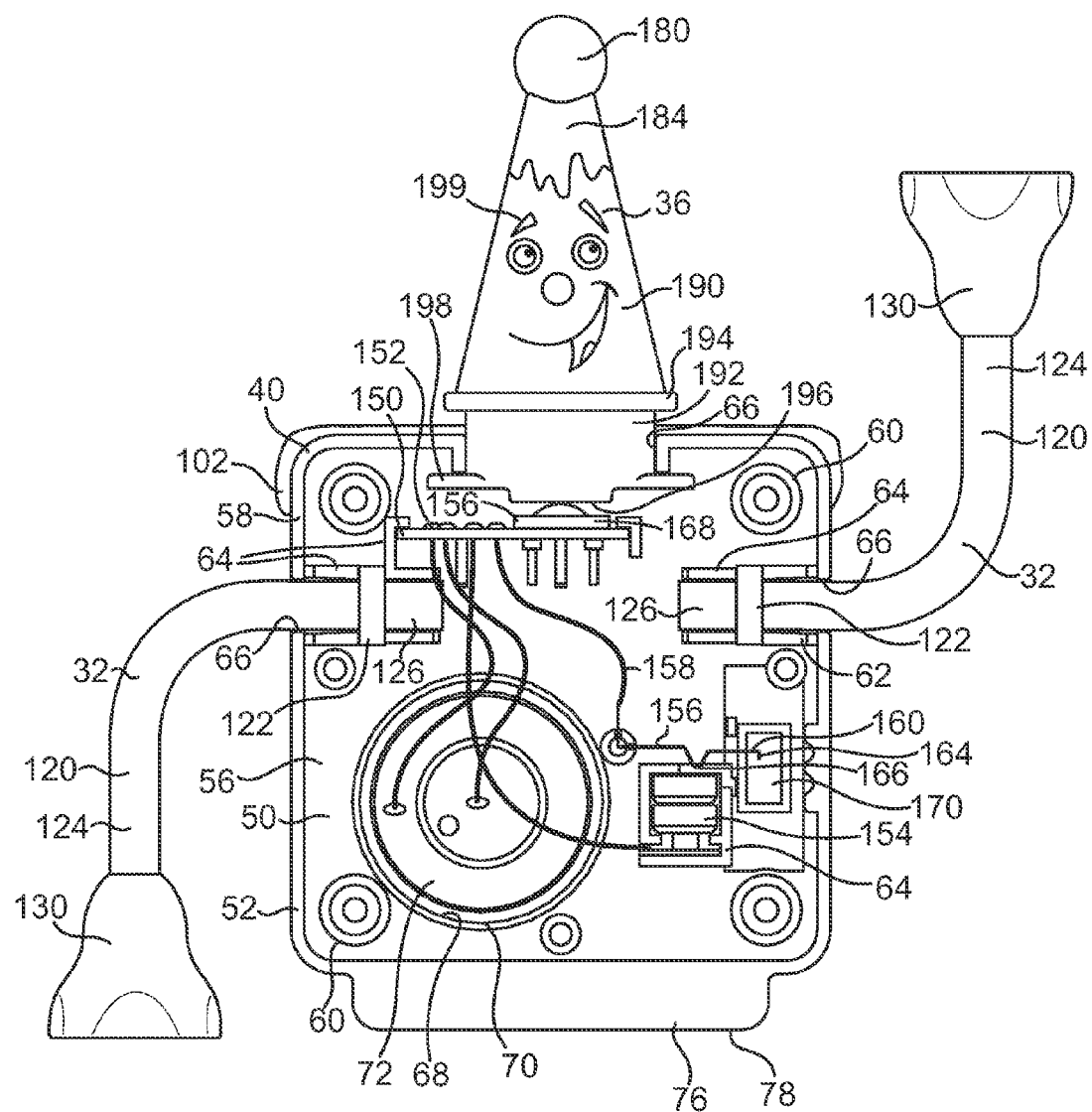
FIG. 12 is a front view illustration of a partially assembled transaction product, according to one embodiment of the present invention.

Various forms of electrical circuit 34 will be apparent to those of skill in the art upon reading the present application. In one embodiment, as illustrated in FIG. 12, electrical circuit 34 includes a printed circuit board (PCB) 150, a speaker 72, memory 152 (generally indicated in FIG. 12), one or more power source 154, one or more switches 156 and connections 158 (e.g., one or more of wires, traces, or other suitable electrical coupling devices).

More specifically, in one embodiment, power source(s) 154 are electrically coupled to components on PCB 150 with connections 158 in any other suitable manner. In one embodiment, PCB 150 includes electrical traces, one or more resistors, one or more capacitors and/or any suitable number of other electrical components facilitating the proper function of electrical circuit 34 and/or electrical connection of electrical components mounted on PCB 150. Power source(s) 154 each provide electrical power to electrical circuit 34. In one embodiment, each power source 154 is an alkaline battery or any other suitable battery. In one embodiment, during periods of non-use of electrical circuit 34, the amount of power provided by power sources(s) 154 to other components of electrical circuit 34 is automatically decreased to prolong the overall functional life span of electrical circuit 34.

In one example, one of connections 158 extends from PCB 150 and is in selective electrical communication with power source(s) 154 to define a power switch 160. For example, a connection 158 is coupled near a first end of a conductive and deformable strip 162. An opposite end 164 of strip 162 is coupled with a mechanical member such as a first activation device 170, which will be further described below. Strip 162 defines a bump or projection 166 extending from a remainder of strip 162 toward an electrical contact of power source(s) 154 or any member in electrical communication with power source(s) 154. When the second end of strip 162 is moved (e.g., moved down with respect to the orientation of FIG. 12), projection 166 is moved into electrical contact with power source(s) 154 to complete at least a portion of electrical circuit 34 such that power source(s) 154 can provide power to a remainder of electrical circuit 34.

In one example, memory 152 is mounted to PCB 150 while speaker 72 is not mounted to PCB 150 but rather is electrically coupled with components on PCB 150 via one or more connections 158. As such, via connections 158, audio files stored to memory 152 may be played via speaker 72. Speaker 72 is any suitable speaker capable of converting electrical impulses into sound waves perceivable by the bearer of transaction product 10, e.g., the consumer and/or recipient. Electrical circuit 34 with speaker 72 is one example of means for generating sound or an audio signal with transaction product 10.

In one embodiment, an activation switch 168 is defined on PCB 150. User interaction with activation switch 168 is configured to activate electrical circuit 34 to play the audio output or to otherwise perform a particular generally non-transactional function. In one embodiment, activation switch 168 is a snap or pressure sensitive domed switch mounted to PCB 150 such as a rubber deformable and elastic switch. More specifically, interaction with activation switch 168 serves to close a connection within electrical circuit 34, which, in turn, activates electrical circuit 34 to perform a task or function corresponding with the activated switch 168 (e.g., to play the audio output per a corresponding file saved to memory 152) as will be further described below.

Notably, although primarily described herein as including a single PCB 150, upon reading this application, one of ordinary skill in the art will recognize that multiple printed circuit boards may be utilized wherein the multiple printed circuit boards and/or the components mounted thereon are electrically coupled to one another. One of ordinary skill in the art will also recognize that other electrical components such as lights, etc. may be added to electrical circuit 34 or used as an alternative to memory 152 and speaker 72. In one example, a recordable element (not shown) is incorporated into electrical circuit 34 and allows for personalization of transaction product 10.

In one embodiment, transaction product 10 includes first activation device 170 (e.g., FIG. 8) providing a bearer interface to electrical circuit 34 such that the bearer can selectively alter electrical circuit 34 to provide or not provide power thereto. As such, first activation device 170 functions as an on/off switch. Referring to FIG. 8, in one example, first activation device 170 defines a primary panel 172, a user interface portion 174 and a reception slot 176.

Primary panel 172 is formed to fit within housing 30 and, in one embodiment, is sized slightly larger than aperture 74 defined by base 40. User interface portion 174 extends from one side of primary panel 172 and is configured to extend at least partially through aperture 74 upon assembly of transaction product 10. Reception slot 176 is defined on a side of primary panel 172 opposite user interface portion 174 and is configured to be mechanically coupled with end 164 of strip 162. As such, upon assembly, movement of first activation device 170 will cause corresponding movement of strip 162 as will be further described below. In one example, first activation device 170 is eliminated and power source(s) 154 continually provide power to electrical circuit 34 or selectively provide power to electrical circuit 34 upon bearer interaction with a second activation device 180 of transaction product 10.

In one embodiment, second activation device 180 provides an interface for the bearer to communicate with electrical circuit 34 to initiate or activate electrical circuit 34 to play the audio output or perform other electrical function. In view of the above, electrical circuit 34 alone or with one or more of activation devices 170 and 180 is one example of means for providing audio output. In one example, second activation device 180 also defines a portion of the character defined by transaction product 10 such as a head of the character. In one embodiment, second activation device 180 is formed of a first member 182 and a second member 184 each formed of a suitable injection molded plastic. In one example, first member 182 defines one or more projections or posts 186 (FIG. 8) extending from an internal surface thereof, and second member 184 defines one or more corresponding reception cavities 188 (FIG. 10) extending from an internal surface thereof. First member 182 and second member 184 are coupled to one another such that each post 186 is received by a corresponding one of reception cavities 188 to collectively define second activation device 180.

In one embodiment, second activation device defines an external portion 190 and an internal portion 192 separated by a rim or rib 194. Internal portion 192 is sized and shaped to be slidably received within an aperture defined by cutout features 66 and 100 of housing 30. External portion 190 is any suitable size and shape and generally remains outside of housing 30. Rib 194 is sized to generally prevent movement of external portion 190 too far into or toward housing 30 and electrical circuit 34 stored therein. More specifically, rib 194 is sized such that rib 194 does not fit into the aperture of housing 30 that receives internal portion 192. As such, rib 194 acts as a stop. In one embodiment, where the size of external portion 190 is sufficient to prevent or decrease undesired movement of external portion 190 of second activation device 180 into the aperture of housing 30 that receives second activation device 180, rib 194 may be eliminated.

Upon assembly, an end 196 of internal portion 192 opposite external portion 190 is positioned to interface with activation switch 168 of electrical circuit 34. In one example, internal portion 192 defines a lip 198 (e.g., FIGS. 10 and 12) that is larger than the aperture of housing 30 that receives internal portion 192 such that lip 198 generally prevents or at least decreases the likelihood that internal portion 192 of second activation device 180 will inadvertently fall out of housing 30.

In one embodiment, auxiliary portion 24 is defined separately from body portion 22 and further defines a portion of the character depicted by transaction product 10. For example, auxiliary portion 24 defines feet 200 of the character coupled to one another via a connecting member 202. Auxiliary portion 24 is configured for separate placement into frosting layer 14 of cake 12 (FIG. 1). In one example, connecting member 202 includes a flange 204 similar to flange 76 of body portion 22 to facilitate placement of auxiliary portion 24 into frosting layer 14 to further decorate cake 12 as will be further described below.

As illustrated with reference to FIGS. 8 and 12, during assembly, each elongated section 120 is placed within housing 30, for example, placed in base 40 as illustrated in FIG. 12. More specifically, each elongated section 120 is placed such that each rim 122 is placed in a corresponding reception slot 128 at least partially defined by base 40 and external portion 124 extends over a cutout feature 66 and outside of base 40.

First activation device 170 is placed in base 40 such that user interface portion 174 extends partially through aperture 74 defined by base. Subsequently, electrical circuit 34 is placed in base 40. More specifically, PCB 150 is placed between a number of positioning features 62, which position and maintain PCB 150 in place relative to base 40. Speaker 72 is positioned within speaker reception area 68 such that rim 70 extends around an outer perimeter of speaker 72. Power source(s) 154 are positioned between other ones of positioning features 62 such that power source(s) 154 are maintained in position relative to base 40. In one embodiment, strip 162 is positioned just above power source(s) 154. End 164 of strip 162 is placed within reception slot 176 of first activation device 170 such that when first activation device 170 is slid between a first position and a second position, projection 166 of strip 162 moves into and out of electrical contact with power source(s) 154.

Second activation device 180 is assembled (i.e., first member 182 is coupled with second member 184) and positioned relative to base 40. More specifically, in one embodiment, second activation device 180 is placed to extend partially over cutout feature 66 such that external portion 190 is positioned outside of base 40 while internal position 192 is positioned at least partially within base 40. In one embodiment, rib 194 and lip 198 are each positioned to selectively interact with at least side wall 52 or side wall 82 to prevent or at least decrease the likelihood that second activation device 180 will move too far out of and too far into housing 30, respectively.

Positioning second activation device 180 relative to base 40 also includes positioning end 196 of second activation device 180 to be adjacent activation switch 168 of electrical circuit 34. In this manner, when second activation device 180 is moved into housing 30, end 196 will contact and press or otherwise activate activation switch 168 causing electrical circuit 34 to play/output the audio file stored to memory 152 assuming power is being supplied to electrical circuit 34 by power source(s) 154.

Once appendage members 32, electrical circuit 34 and one or more activation device 170 and/or 180 are positioned with respect to base 40, cover 42 is coupled to base 40 to at least partially enclose each of electrical circuit 34 and the one or more activation device 170 and/or 180 therebetween as illustrated in with reference to FIGS. 2 and 8 for example.

More specifically, in one embodiment, base 40 is placed on cover 42 such that inside edge 58 of base 40 interfaces with inside edge 88 of cover 42. In one example, adhesive is applied between inside edge 58 and inside edge 88 to secure base 40 to cover 42 and/or cover 42 is ultrasonically welded or otherwise coupled with base 40 along inside edges 58 and 88. In one embodiment, upon coupling of base 40 with cover 42, cylindrical protrusions 60 (FIG. 8) of base 40 each receive one of the protrusions 90 (FIG. 9) of cover 42. In one example, connection device 94 extends into housing through hollow cylindrical protrusion 60 and into cavity 92 of protrusions 90 to alternatively or additionally secure base 40 to cover 42. It should be understood that while assembly is described by placing components into base 40 before base 40 is coupled with cover 42, in one embodiment, at least a portion of the components may be placed in cover 42 before base 40 is coupled with cover 42. In addition, other methods of securing base 40 to cover 42 are contemplated.

Upon final assembly, transaction product 10 functions to both amuse consumers and/or recipients and to entice consumers to purchase transaction product 10. In particular, in one example, upon a consumer or recipient pressing second activation device 180 toward housing 30, second activation device 180 interacts with electrical circuit 34 causing electrical circuit 34 to play the audio file stored therein. In one embodiment, various portions of transaction product 10 such as body portion 22, appendage member(s) 32, auxiliary portion 24 and/or second activation device 180 each define a different part of the same character to be depicted by the assembled transition product 10. Prior to purchase of transaction product 10, the audio or other electrical aspect of transaction product 10 serves to both amuse and entice the consumer to purchase transaction product 10. Following purchase, the audio aspect of transaction product 10 serves to at least amuse the consumer, the recipient and/or any other observers of transaction product 10.

Figure 13:
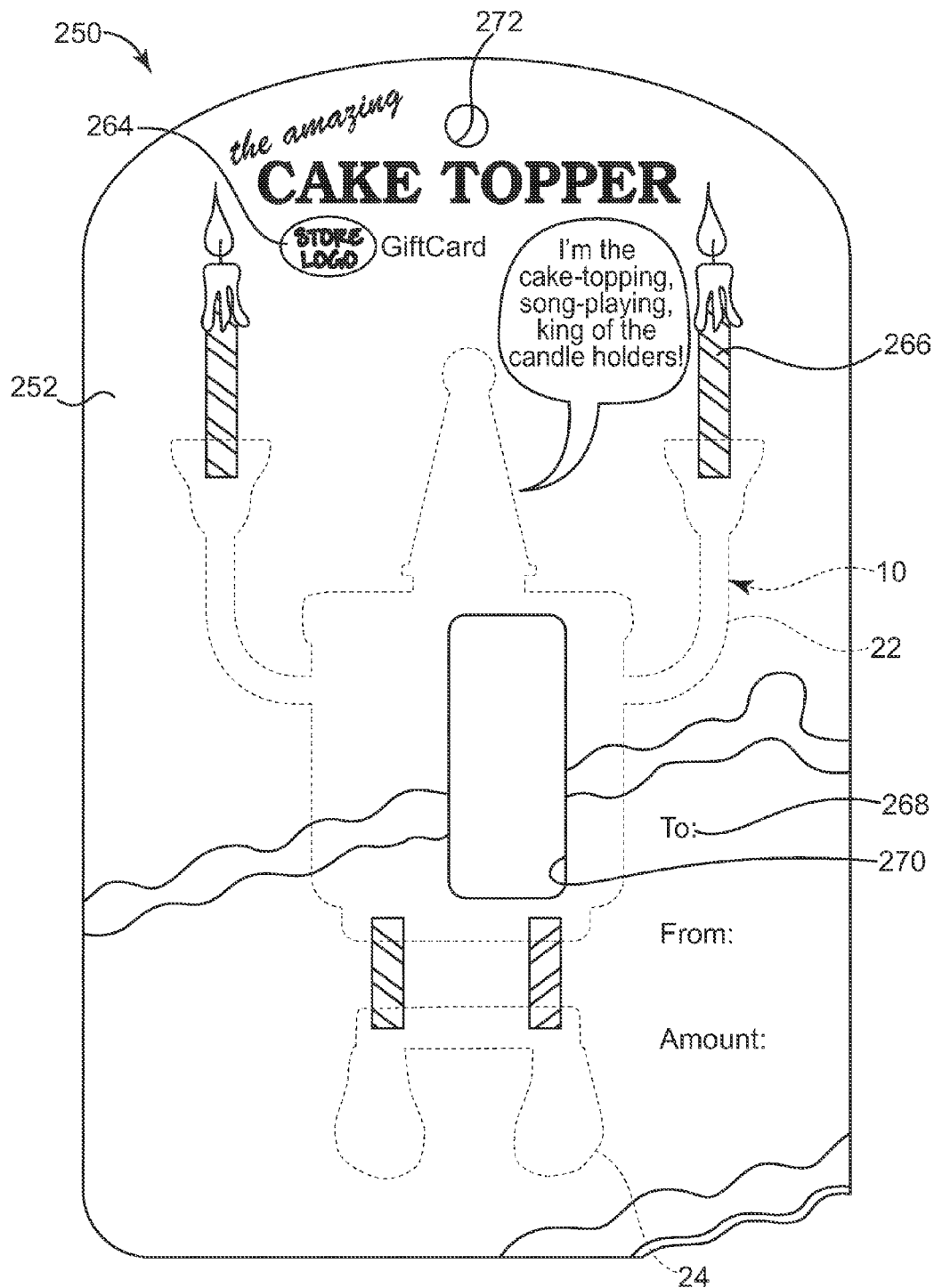
FIG. 13 is a front view illustration of a backer for a transaction product, according to one embodiment of the present invention.

FIGS. 13 and 14 illustrate a carrier or backer 250 supporting transaction product 10 (FIGS. 1-6). Backer 250 comprises a single layer or multiple layers of paper or plastic material, for example, generally in the form of a relatively stiff but bendable/flexible card. Use of other materials is also contemplated. As such, backer 250 defines a first or front surface 252 (FIG. 13) and a second or rear surface 254 (FIG. 14). Transaction product 10, which is generally represented in phantom lines in FIG. 13 for illustrative purposes (e.g., to allow for full viewing of front surface 252), is readily releasably attached to backer 250, for example, by adhesive, blister packaging, overlying skinning material or the like, such that transaction product 10 with backer 250 collectively define a transaction product assembly 256.

Backer 250 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 252 and 254. In one example, the indicia include one or more of redemption indicia 260, instructional field indicia 262, brand indicia 264, decorative indicia 266, message field indicia 268, etc.

Redemption indicia 260, which are generally indicated with a dashed line box in FIG. 14, inform a bearer of transaction product assembly 256 that transaction product 10 is redeemable for the purchase of goods and/or services and that upon use, a value of the purchased goods and/or services will be deducted from the financial account or record linked to transaction product 10. In one embodiment, redemption indicia 260 include phrases such as "<NAME OF STORE> Gift-Card" and "This GiftCard is redeemable for merchandise or services at any of our stores or at our website," and/or provides help or phone line information in case of a lost, stolen or damaged transaction product 10, etc.

Instructional indicia 262, which are generally indicated with a dashed line box in FIG. 14, provide instructional information regarding the non-transactional components of transaction product 10 that serve to both promote the functionality of transaction product 10 to potential consumers and to inform the end bearer of transaction product 10 about functionality and interaction with transaction product 10. In one embodiment, instructional indicia 262 include information regarding one or more of the candle holding functionality of transaction product 10, the bendable nature of appendage members 32, the use of transaction product 10 as a cake decoration, and the audio functionality of transaction product 10. For example, instructional indicia 262 instruct the bearer of transaction product 10 to place body portion 22 and/or auxiliary portion 24 into the cake by placing the respective flanges 76 and 204 into frosting layer 14 of cake 12.

Brand indicia 264 identify a store, brand, department, etc. and/or services associated with transaction product 10. Any decorative indicia 266, which may be similar to or coordinate with indicia of transaction product 10, may also be included on backer 250. In one example, message field indicia 268 include "to," "from" and "amount" fields and/or are otherwise configured to be written to by the bearer of transaction product assembly 256 prior to presenting transaction product assembly 256 to a recipient. As such, message field indicia 268 facilitate the consumer in preparing transaction product assembly 256 for gifting to a recipient.

Any of indicia 260, 262, 264, 266, 268 or other indicia optionally may appear anywhere on backer 250 or transaction product 10. In one embodiment, at least one of indicia 260, 262, 264, 266, 268 or other indicia include stylized text further contributing to the aesthetics of transaction product assembly 256 as illustrated, for example, in FIGS. 13 and 14. Additional information besides that specifically described and illustrated herein may also be included.

In one embodiment, backer 250 includes a window or opening 270 for displaying account identifier 18 of transaction product 10 as illustrated in FIG. 14. As previously described, account identifier 18 is adapted for accessing an account or record associated with transaction product 10 for activating, loading or debiting value from the account or record. Accordingly, in one embodiment, opening 270 allows direct visual and/or physical access to account identifier 18 to activate and/or load transaction product 10 without removing transaction product 10 from backer 250.

In one example, backer 250 includes a hanging or other aperture 272 configured to facilitate display of transaction product assembly 256. For instance, aperture 272 is sized and shaped to receive an arm (not shown) or other retail fixture such that transaction product assembly 256 is configured to hang from the retail fixture for display prior to purchase of transaction product 10. Other methods of displaying transaction product assembly 256 are also contemplated, and other backers, such as foldable backers (not shown), can be used with various sizes and shapes of transaction products 10.

Figure 15:
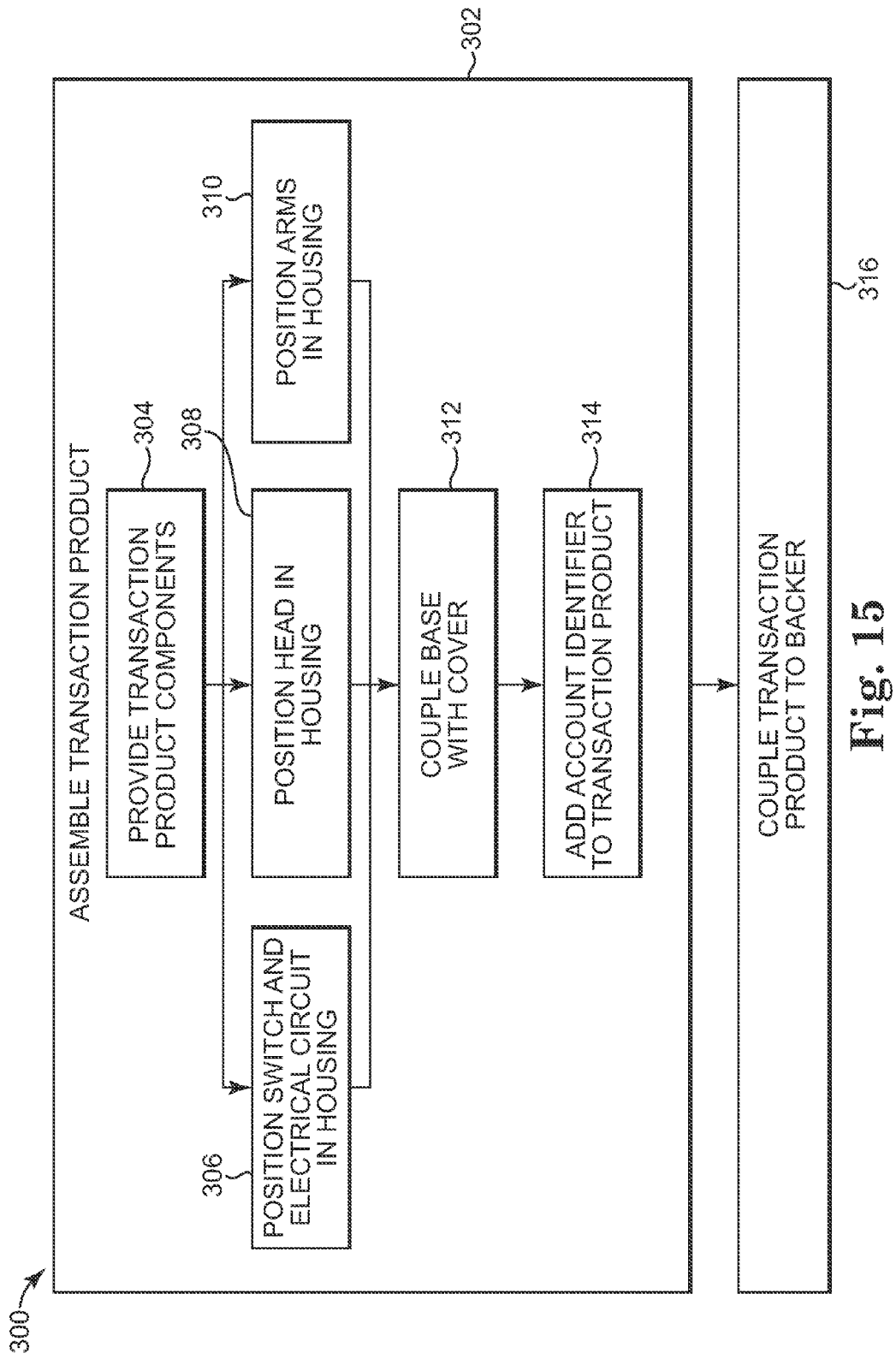
FIG. 15 is a flow chart illustrating a method of assembling the transaction product of FIG. 1, according to one embodiment of the present invention.

FIG. 15 is a flow chart illustrating one embodiment of a method 300 of assembling transaction product 10. For example, at 302, transaction product 10 is assembled. More specifically, at 304, housing 30, appendage members 32, electrical circuit 34 and activation device(s) 170 and/or 180 are provided. At 306, electrical circuit 34 and first activation device 170 are positioned within an interior portion of base 40. For example, first activation device 170 is positioned within base 40 to align with and be partially accessible from a position external to housing 30 via aperture 74. Electrical circuit 34 is positioned in base 40 as described above such that various positioning features 64 of base 40 interact with various components of electrical circuit 34 to maintain the components of electrical circuit 34 in place with respect to base 40. In addition, in one example, end 164 of strip 162 is placed in reception slot 176 of first activation device 170.

At 308, character head or other second activation device 180 is positioned at least partially in housing 30, for example, in base 40. More specifically, second activation device 180 is positioned adjacent switch 156 of electrical circuit 34 and at least partially extends outside of base 40. In one embodiment, second activation device 180 is positioned such that rib 194 and lip 198 generally prevent undesired movement of second activation device 180 too far into and/or too far out of housing 30 while still allowing for linear, slidable movement of second activation device 180 at least partially into and out of housing 30.

In one embodiment, at 310, appendage members 32, more specifically, elongated sections 120, are positioned with respect to base 40. For example, each rim 122 is placed within a corresponding reception slot 128 at least partially defined by base 40 such that each elongated section 120 is able to rotate relative to base 40. Once positioned, each elongated section 120 extends from within base 40 out a cutout feature 66 thereof.

Once electrical circuit 34, activation device(s) 170 and/or 180 and appendage members 32 are positioned relative to base 40, base 40 and cover 42 are coupled to one another at 312. In one instance, inside edge 88 of base 40 is positioned to abut and be secured to inside edge 88 of cover 42 as described above, and base 40 and cover 42 are adhered, ultrasonically welded, screwed or otherwise coupled to one another. Other methods of coupling base 40 and cover 42 are also contemplated as are alternative housings that may or may not include base 40 and/or cover 42.

At 314, account identifier 18 is added to housing 30, if account identifier is not already part of transaction product 10. Although pictured in FIG. 15 as occurring after all of operations 304, 306, 308, 310 and 312, it should be understood that account identifier 18 may be applied to housing 30 or any portion thereof at any suitable time during manufacturing and assembly thereof. For example, account identifier 18 may be molded into or otherwise integrally formed as part of housing 30, may be enclosed within housing 30 and/or may be printed or otherwise applied to housing 30 before, during or after one or more of operations 304, 306, 308, 310 and 312 as will be apparent to those of skill in the art upon reading this application.

At 316, transaction product 10 is coupled with backer 250 as generally illustrated with additional reference to FIGS. 13 and 14 to form transaction product assembly 256. Body portion 22 and auxiliary portion 24 of transaction product 10 may each be adhered, skinned to, blister packed with or otherwise suitably coupled with backer 250. In one embodiment, account identifier 18 of transaction product 10 is accessible for scanning while transaction product 10 is coupled with backer 250, for example, through opening 270 in backer 250. In one example, auxiliary portion 24 is eliminated such that transaction product 10 and backer 250 define transaction product assembly 256.

Figure 16:
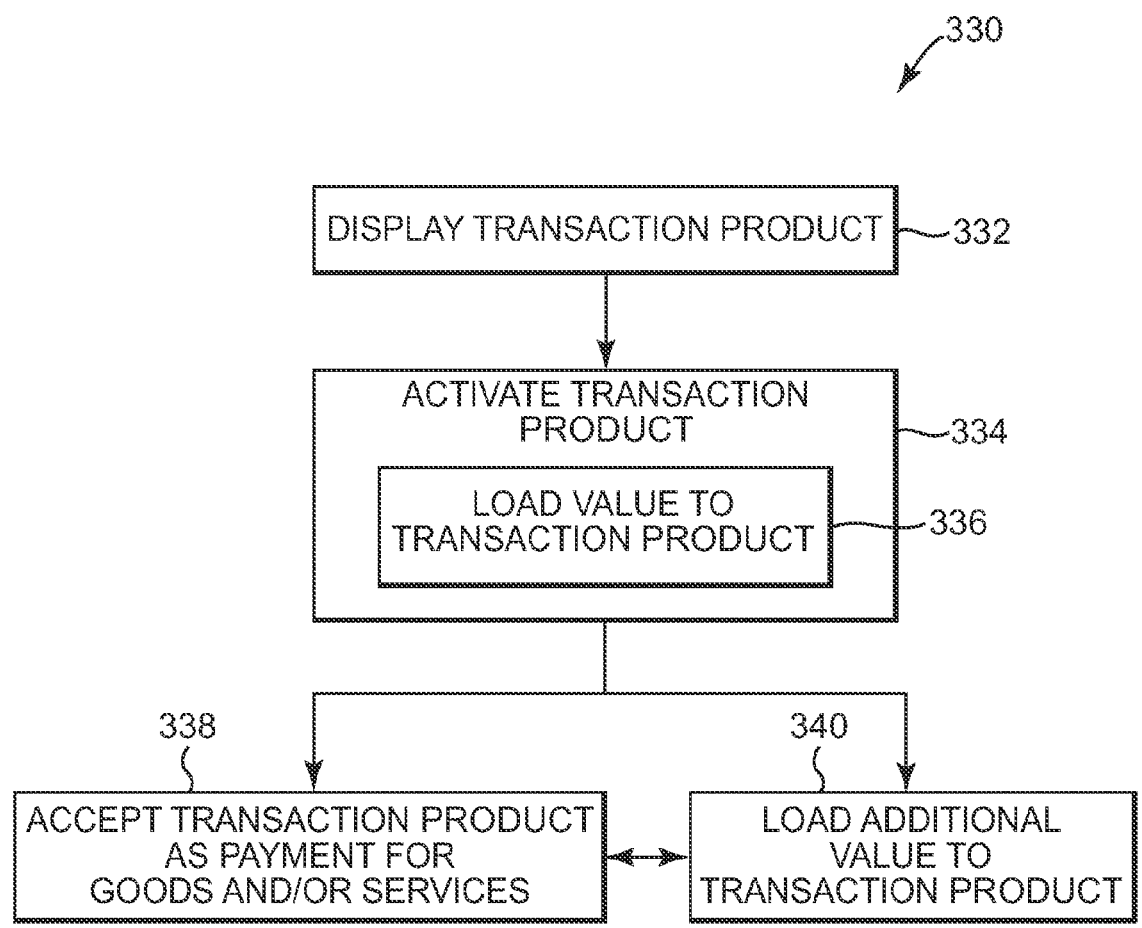
FIG. 16 is a flow chart illustrating a method of encouraging purchase and supporting use of a transaction product, according to one embodiment of the present invention.

FIG. 16 is a flow chart illustrating one embodiment of a method 330 of encouraging purchase and supporting use of transaction product 10 by consumers and/or recipients. At 332, transaction product 10 is placed on or hung from a rack, shelf or other similar device to display transaction product 10 for sale to potential consumers. In one embodiment, a depiction of transaction product 10 is placed on a web site for viewing and purchase by potential consumers. In one example, display of transaction product 10 includes advertising the non-transactional features of transaction product 10 (e.g., the candle holding functionality of transaction product 10, the bendable nature of appendage members 32, configuration of transaction product 10 for use as a cake decoration, and the audio functionality of transaction product 10) to encourage consumer purchase of transaction product 10, for example, in the form of indicia 260, 262, 264, 266, 268, etc.

At 334, a consumer who has decided to purchase transaction product 10 presents transaction product 10, which may be on backer 250, to a retail store employee, retail store kiosk, remote terminal or other person or device to scan account identifier 18 to access an account or record linked to account identifier 18. In particular, account identifier 18 is scanned or otherwise accessed, for example through opening 270 of backer 250 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 18) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 332, then, at 334, transaction product 10 may be activated in any suitable method and may not require the physical scanning of account identifier 18 to be activated or to otherwise access the associated account or record such as at 334.

In one example, at 338, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 18) is applied toward the purchase of goods and/or services. At 340, additional value is optionally loaded on transaction product 10 at a point-of-sale terminal, kiosk or other area of the retail store, retail web site or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services at 338 is limited by whether the account or record associated with transaction product 10 has any value stored or recorded therein at the time of attempted redemption.

FIG. 17 is a flow chart illustrating one embodiment of a method 360 of using transaction product 10 (e.g., FIGS. 1-8). At 362, a potential consumer of transaction product 10, which is displayed in a retail store or viewed on a web site, decides to and does purchase transaction product 10 from the retail store or web site. In one embodiment, consumer purchases transaction product 10 after being enticed to do so by the inclusion of one or more of the non-transactional features of transaction product 10. It should be understood that transaction product 10 can be displayed and purchased alone or as part of transaction product assembly 256 along with backer 250 (FIG. 14).

Upon purchasing transaction product 10, a retail store employee, a retail store kiosk or other person or device scans account identifier 18 (e.g., FIG. 4), for example, through opening 270 of backer 250 (FIG. 14) or otherwise reads or accesses account identifier 18. Upon accessing account identifier 18, the account or record linked to account identifier 18 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 18 may be eliminated and/or manual input of code 20 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. Each transaction product 10 may be given alone, as part of transaction product assembly 256 or as a decoration on cake 12. As an alternative, the consumer can keep transaction product 10 for his or her own use thereby eliminating operation 364.

At 366, the consumer, recipient or other current bearer of transaction product 10 interacts with transaction product 10. In one embodiment, playing or otherwise interacting with transaction product 10 at 326 includes one or more of placing portions of transaction product 10 on cake 12 (FIG. 1) for decoration, playing an audio file (e.g., by interacting with one or more of activation devices 170 and 180), placing candles 16 (FIG. 1) to be held by transaction product 10, creating a multiple member character by using body portion 22 in connection with auxiliary portion 24, posing elongated sections 120 to alter the appearance of transaction product 10, etc. Each of these interactions allows the bearer of transaction product 10 to be amused and/or to utilize additional functionality of transaction product 10 (i.e., as decoration, as a candle holder, a toy, etc.)

At 368, the consumer or recipient redeems transaction product 10 for goods and/or services from the retail store or web site. At 370, the consumer or recipient of transaction product 10 optionally adds value to transaction product 10, more particularly, to the account or record associated with account identifier 18 included therewith, at the retail store or over the Internet (i.e., via the web site). Upon playing with transaction product 10 at 366, redeeming transaction product 10 at 368 or adding value to transaction product 10 at 370, the consumer or recipient of transaction product 10 subsequently can perform either of operations 366, 368 or 370 as desired. In one embodiment, the ability of the consumer or recipient to repeat redeeming transaction product 10 at 368 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, the number of stores or retail establishments includes at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product for use as a cake topper, comprising:
    a body portion defining a support member and a flange extending from the support member, wherein the flange is configured for placement into a frosting layer on a cake, wherein the body portion defines a first part of a character;
    an auxiliary portion formed separately from the body portion and defining a second part of the character, wherein the auxiliary portion defines a lip configured for placement into the frosting layer on the cake; and
    a machine readable account identifier coupled to at least one of the body portion and the auxiliary portion, the account identifier linking the transaction product to an account or record for tracking a value associated with the transaction product.

2. The transaction product of claim 1, wherein the machine readable account identifier is a bar code connected to the body portion.

3. The transaction product of claim 1, wherein the machine readable account identifier includes at least one of a bar code, a magnetic strip, a smart chip and a radio frequency identification (RFID) device.

4. The transaction product of claim 1, wherein the support member is substantially enclosed and defines a first thickness, the flange defines a second thickness and the second thickness is less than about half the first thickness.

5. The transaction product of claim 1, wherein the auxiliary portion defines feet of the character.

6. The transaction product of claim 1, wherein the body portion includes an electrical circuit configured to emit an audio output upon initiation by a bearer of the transaction product.

7. The transaction product of claim 6, further comprising an activation device at least partially extending outside the support member and positioned to interact with the electrical circuit, wherein the activation device is configured to initiate the electrical circuit to emit the audio output and depicts a third part of the character.

8. The transaction product of claim 7, wherein the first part, the second part and the third part each depict a different one of a body, a head and feet of the character.

9. The transaction product of claim 6, wherein the support member substantially encloses the electrical circuit.

10. The transaction product of claim 1, further comprising an appendage member extending from the body portion and depicting a third part of the character.

11. The transaction product of claim 10, wherein the appendage member is repeatedly bendable and configured to be posed in any one of a plurality of configurations relative to the body portion.

12. The transaction product of claim 10, wherein the appendage member is sized and shaped to selectively and securely maintain at least one candle.

13. The transaction product of claim 1, further comprising an appendage member, an electrical circuit and an activation device, wherein the appendage member is coupled to the body portion, configured to securely maintain at least one candle and is repeatedly bendable and configured to be posed in any one of a plurality of configurations relative to the body portion, the electrical circuit is substantially enclosed within the body portion, the activation device selectively communicates with the electrical circuit to initiate playing of the audio output and the auxiliary portion defines feet of the body portion.

14. The transaction product of claim 1, in combination with a carrier releasably coupled to the support member.

15. A stored-value product comprising:
    machine readable means for linking the stored-value product with at least one of an account and a record having a value associated therewith such that the stored-value product can be used as payment toward a purchase of one or more of goods and services;
    means for securely maintaining a candle; and
    means for supporting the means for securely maintaining the candle, wherein the machine readable means for linking is coupled to the means for supporting.

16. The stored-value product of claim 15, wherein the means for securely maintaining the candle are movable relative to the means for supporting.

17. The stored-value product of claim 16, wherein the means for securely maintaining the candle are rotatable relative to the means for supporting.

18. The stored-value product of claim 16, wherein the means for securely maintaining the candle are bendable to any one of a plurality of desired positions relative to the means for supporting.

19. The stored-value product of claim 15, further comprising means for embedding the means for supporting into a layer of frosting on a cake such that the means for supporting extends upright from the cake.

20. The stored-value product of claim 15, wherein the means for supporting depicts a first portion of a character, the stored-value product further comprising means for providing audio output including an activation device, which is configured to define a second portion of the character and is configured to initiate playing of the audio output upon direction from a bearer of the stored-value product.

21. A transaction card comprising:
    a first portion;
    an elongated section extending from the first portion, wherein the elongated section includes a bendable wire surrounded with a cladding, the elongated section is configured to be repeatedly bent and repositioned into a plurality of positions relative to the first portion by bearer manipulation of the transaction card, and the elongated section is configured to maintain any one of the plurality of positions following bearer manipulation of the transaction card;
    an activation area linked to an account or record such that a value from the account or record can be applied toward a purchase of one or more of a good and a service upon presentation of the transaction card during a retail sale transaction.

22. The transaction card of claim 21, wherein the elongated section includes a candle receptor on an end thereof opposite the first portion.

23. The transaction card of claim 21, further comprising a flange extending away from the first portion and configured to be inserted into a frosting layer on a cake such that the transaction card serves as a cake topper for the cake.

24. A method of encouraging purchase and supporting use of a stored-value card linked to a record or account, the method comprising:
    displaying the stored-value card to a potential consumer;
    instructing the potential consumer that the stored-value card is configured for use on top of a decorated cake;
    providing instructions for additional non-transactional functionality of the stored-value card; and
    activating the record or account linked to the stored-value card to permit subsequent deductions from a value associated with the record or account for application toward one of a purchase and a use of one or more of goods and services.

25. The method of claim 24, wherein the additional non-transactional functionality of the stored-value card includes one or more of audio storage, selective output of an audio file, candle holding, provision of selectively posable members and character depiction.

* * * * *